United States Patent
Kim (10) Patent No.: US 9,629,008 B2
(45) Date of Patent: Apr. 18, 2017

(54) MONITORING DEVICE FOR DISTRIBUTED ANTENNA SYSTEM

(71) Applicant: SOLiD, INC., Seongnam-si, Gyeonggi-do (KR)

(72) Inventor: Doyoon Kim, Bucheon-si (KR)

(73) Assignee: SOLID, INC., Seongnam-si (KR)

( * ) Notice: Subject to any disclaimer, the term of this patent is extended or adjusted under 35 U.S.C. 154(b) by 0 days.

(21) Appl. No.: 15/084,603

(22) Filed: Mar. 30, 2016

(65) Prior Publication Data

US 2016/0212640 A1  Jul. 21, 2016

Related U.S. Application Data (63) Continuation of application No. PCT/KR2015/014448, filed on Dec. 29, 2015.

(30) Foreign Application Priority Data

Dec. 30, 2014 (KR) .................. 10-2014-0194367
Feb. 24, 2015 (KR) .................. 10-2015-0026059

(51) Int. Cl.
*H04W 28/10* (2009.01)
*H04W 24/04* (2009.01)
*H04W 24/10* (2009.01)
*H04B 17/00* (2015.01)
(Continued)

(52) U.S. Cl.
CPC ............ *H04W 24/04* (2013.01); *H04B 17/00* (2013.01); *H04B 17/15* (2015.01); *H04B 17/29* (2015.01); *H04W 24/10* (2013.01)

(58) Field of Classification Search
CPC . H04L 43/50; H04L 43/0811; H04L 43/0835; H04L 43/0481; H04L 43/10; H04L 45/26; H04L 43/00; H04L 43/18; H04L 12/24; H04L 12/26; H04L 41/0631; H04J 3/14; H04Q 11/045; H04B 17/00; H04B 3/46; H04W 24/00; H04M 3/10
USPC ........ 370/247–252, 312, 366–368, 386, 390, 370/400–401, 412, 422, 428–429; 709/201, 205, 211, 217–218, 223–224, 709/243; 725/103, 114, 121, 123, 135, 725/144–145
See application file for complete search history.

(56) References Cited

U.S. PATENT DOCUMENTS 7,281,172 B2   10/2007  Chujo
2002/0080752 A1*  6/2002  Johansson ............... H04L 29/06
                                                                370/338
(Continued)

OTHER PUBLICATIONS

International Search Report issued in PCT/KR2015/014448 mailed Dec. 29, 2015.
Written Opinion issued in PCT/KR2015/014448 mailed May 19, 2016.

*Primary Examiner* — Mohamed Kamara
(74) *Attorney, Agent, or Firm* — Sughrue Mion, PLLC (57) ABSTRACT

A monitoring device for a distributed antenna system including at least two node units communicatively coupled to each other transmits, to at least one target node unit among the node units, a data dump command for a first target signal passing through a first signal path in the target node unit. The monitoring device receives, from the target node unit, response data corresponding to the data dump command. The monitoring device generates first quality information indicative of the quality of the first target signal by using the response data.

14 Claims, 6 Drawing Sheets

(51) Int. Cl.
*H04B 17/15* (2015.01)
*H04B 17/29* (2015.01)

(56) References Cited

U.S. PATENT DOCUMENTS

| | | | |
|---|---|---|---|
| 2003/0043753 A1* | 3/2003 | Nelson | H04J 3/14 370/249 |
| 2003/0229549 A1* | 12/2003 | Wolinsky | G06Q 30/0248 705/14.61 |
| 2006/0145884 A1 | 7/2006 | Graham et al. | |
| 2006/0176967 A1* | 8/2006 | Stanton | G01R 23/16 375/260 |
| 2006/0268908 A1* | 11/2006 | Wang | H04L 12/2697 370/401 |
| 2006/0274760 A1* | 12/2006 | Loher | H04M 3/2236 370/395.52 |
| 2007/0086349 A1* | 4/2007 | Liu | H04L 41/5038 370/241 |
| 2009/0003193 A1* | 1/2009 | Francescon | H04W 24/04 370/216 |
| 2012/0297251 A1* | 11/2012 | Masser | G06F 11/3414 714/37 |
| 2014/0024402 A1 | 1/2014 | Singh | |

\* cited by examiner

MONITORING DEVICE FOR DISTRIBUTED ANTENNA SYSTEM

CROSS REFERENCE TO RELATED APPLICATIONS

This application is a Continuation of PCT International Application No. PCT/KR2015/014448, filed Dec. 29, 2015, and claims priority from Korean Patent Applications No. 10-2014-0194367 filed Dec. 30, 2014 and No. 10-2015-0026059 filed Feb. 24, 2015, the contents of which are incorporated herein by reference in their entireties.

BACKGROUND

1. Field

The inventive concept relates to a monitoring device applicable to a distributed antenna system (DAS).

2. Description of Related Art

Conventionally, there was used a method in which, when a service error occurred in a distributed antenna system (DAS) network, a manager directly checked whether a corresponding equipment was abnormal using a spectrum analyzer at a place where equipments constituting the DAS network were located.

However, the conventional method has the following problems when the manager monitors an error of the DAS network. For example, in the DAS network, a plurality of node units such as a head-end (HE) unit, a plurality of hub units, and a plurality of remote units are communicatively coupled to each other, and therefore, the manager has difficulty in detecting in which part a problem has occurred. Also, when the DAS network is applied to a subway, a relay tower, etc., a manager's access is limited, and therefore, the manager has difficulty in checking whether an error has occurred. Also, when a problem occurs in a service due to an error of a signal input from a base station, an abnormality of an optical fiber, a defect of a remote unit, etc., the manager has difficulty in detecting an accurate cause. Also, when a service signal is degraded due to a defect of a power amplification unit (PAU), the manager has difficulty in detecting an accurate cause. Also, when a problem occurs in a reverse service due to a defect of a specific remote node, the manager has difficulty in detecting an abnormally operating remote unit. Also, in the DAS network to which a direct digital interface (DDI) such as a common public radio interface/open base station architecture initiative is applied, the manager cannot analyze the occurrence cause, position, and the like of a failure by using the conventional method.

SUMMARY

An embodiment of the inventive concept is directed to a monitoring device applicable to a distributed antenna system (DAS).

According to an aspect of the inventive concept, there is a provided a monitoring device for a distributed antenna system including at least two node units communicatively coupled to each other, the monitoring device: transmitting, to at least one target node unit among the node units, a data dump command for a first target signal passing through a first signal path in the target node unit; receiving, from the target node unit, response data corresponding to the data dump command; and generating first quality information indicative of the quality of the first target signal by using the response data.

According to an exemplary embodiment, wherein the response data may be data stored in the target node unit while the first target signal is being processed by signal processing components related to the first signal path.

According to an exemplary embodiment, wherein the first quality information may indicate a quality index for the first target signal, wherein the quality index may be related to at least one signal quality characteristic among spectrum, power, peak level in time domain, adjacent channel leakage ratio (ACLR), error vector magnitude (EVM), occupied bandwidth (OBW), spectrum emission mask (SEM), noise figure (NF), complementary cumulative distribution function (CCDF), signal to noise ratio (SNR), and spurious characteristic.

According to an exemplary embodiment, wherein the monitoring device may comprise: an interface unit configured to transmit the data dump command to the target node unit and receive the response data from the target node unit; a controller configured to generate the data dump command and generate the first quality information by using the response data transmitted from the interface unit; and a display unit configured to display the first quality information.

According to an exemplary embodiment, wherein the controller may receive a manager's dump request input through a predetermined graphic user interface (GUI) displayed on the display unit, generate the data dump command in response to the manager's dump request input, and transmits the data dump command to the interface unit.

According to an exemplary embodiment, wherein the controller may receive a manager's information output request input through the predetermined GUI displayed on the display unit, and transmit the first quality information in response to the manager's information output request input.

According to an exemplary embodiment, wherein the monitoring device may receive, from the target node unit, report data on a second target signal passing through a second signal path in the target node unit, and generate second quality information indicative of the quality of the second target signal by using the report data.

According to an exemplary embodiment, wherein the report data may be data stored in the target node unit while the second target signal is being processed by signal processing components related to the second signal path, and wherein the report data may be data transmitted from the target node unit regardless of the data dump command.

According to an exemplary embodiment, wherein the monitoring device may analyze whether a failure has occurred in the first signal path by using the response data, and generate first analysis information indicative of whether the failure has occurred in the first signal path, based on the analyzed result.

According to an exemplary embodiment, wherein the monitoring device may detect whether a failure has occurred in the first signal path by using the response data, and transmit, to the target node unit, a predetermined control signal for controlling the signal processing components related to the first signal path, based on the detected result.

According to an exemplary embodiment, wherein the monitoring device may be communicatively coupled to the target node unit through a wired or wireless network.

According to an exemplary embodiment, wherein the data dump command and the response data may be transmitted through a control & management (C&M) channel or a specific channel between the monitoring device and the target node unit.

According to another aspect of the inventive concept, there is a provided a monitoring device for a distributed antenna system including at least two node units communicatively coupled to each other, the monitoring device: receiving, from at least one target node unit among the node units, report data on a target signal passing through a specific signal path in the target unit node; and generating quality information indicative of the quality of the target signal by using the report data.

According to an exemplary embodiment, wherein the report data may be data stored in the target node unit while the target signal is being processed by signal processing components related to the specific signal path.

According to an exemplary embodiment, wherein the quality information may indicate a quality index for the target signal, wherein the quality index may be related to at least one signal quality characteristic among spectrum, power, peak level in time domain, ACLR, EVM, OBW, SEM, NF, CCDF, SNR, and spurious characteristic.

According to an exemplary embodiment, wherein the monitoring device may receive, from the target node unit, self-analysis information indicative of whether a failure has occurred in the specific signal path in the target node unit.

According to an exemplary embodiment, wherein the monitoring device may transmit, the target node unit, a predetermined control signal for controlling the signal processing components related to the specific signal path, based on the self-analysis information.

In the monitoring device for the DAS according to the inventive concept, a manager can monitor various failures that occur in a specific node of the DAS, further, internal signal processing components constituting the corresponding specific node by remotely identifying the spectrum, error vector magnitude (EVM), adjacent channel leakage ratio (ACLR), signal to noise ratio (SNR), and the like of a specific signal path in the DAS through a graphic user interface (GUI).

BRIEF DESCRIPTION OF THE FIGURES

Exemplary embodiments of the inventive concept will be more clearly understood from the following detailed description taken in conjunction with the accompanying drawings in which.

DETAILED DESCRIPTION OF EXEMPLARY EMBODIMENTS

Exemplary embodiments of the inventive concept will be described below in more detail with reference to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art. Throughout the disclosure, like reference numerals refer to like parts throughout the various figures and embodiments of the inventive concept.

In description of the inventive concept, detailed explanation of known related functions and constitutions may be omitted to avoid unnecessarily obscuring the subject manner of the inventive concept. Ordinal numbers (e.g. first, second, etc.) are used for description only, assigned to the elements in no particular order, and shall by no means specify the name of the pertinent element or restrict the claims.

It will be understood that when an element is "connected" or "coupled" to another element, the element may be directly connected or coupled to another element, and there may be an intervening element between the element and another element. To the contrary, it will be understood that when an element is "directly connected" or "directly coupled" to another element, there is no intervening element between the element and another element.

Hereinafter, a distributed antenna system (DAS) will be mainly described as an application example to which embodiments of the inventive concept are applicable. However, the embodiments of the inventive concept are identically or similarly applicable to other signal distributed transmission systems such as a base transceiver station distributed antenna system as well as the DAS.

Figure 1:
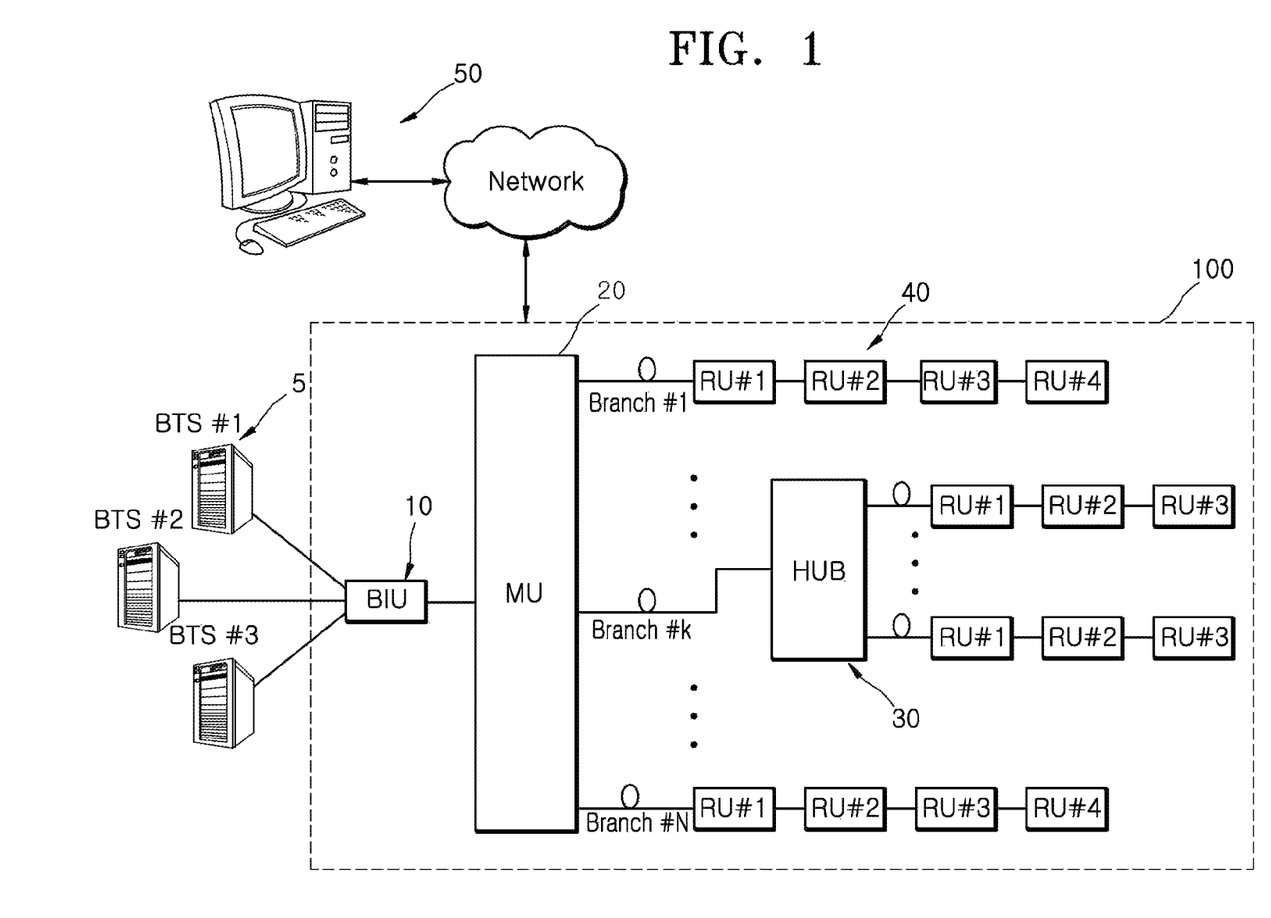
FIG. 1 is a diagram illustrating an example of a topology of a distributed antenna system (DAS) as one form of a signal distributed transmission system to which the inventive concept is applicable.

FIG. 1 is a diagram illustrating an example of a topology of a distributed antenna system (DAS) as one form of a signal distributed transmission system to which the inventive concept is applicable.

Referring to FIG. 1, the DAS 100 may include a base station interface unit (BIU) 10 and a main unit (MU) 20, which constitute a head-end node, a hub unit (HUB) 30 serving as an extension node, and a plurality of remote units (RUs) 40 respectively disposed at remote service positions. The DAS 100 may be implemented as an analog DAS or a digital DAS. When necessary, the DAS 100 may be implemented as a hybrid of the analog DAS and the digital DAS (e.g., to perform analog processing on some nodes and digital processing on the other nodes).

However, FIG. 1 illustrates an example of the topology of the DAS 100, and the DAS 100 may have various topologies in consideration of particularity of its installation areas and application fields (e.g., in-building, subway, hospital, stadium, etc.). In view of the above, the number of the BIU 10, the MU 20, the HUB 30, and the RUs 40 and connection relations between upper and lower nodes among the BIU 10, the MU 20, the HUB 30, and the RUs 40 may be different from those of FIG. 1. In the DAS 100, the HUB 30 may be used when the number of branches to be branched in a star structure from the MU 20 is limited as compared with the number of RUs 40 required to be installed. Therefore, the HUB 30 may be omitted when only the single MU 20 sufficiently covers the number of RUs 40 required to be installed, when a plurality of MUs 20 are installed, or the like.

Hereinafter, nodes in the DAS 100 applicable to the inventive concept and their functions will be sequentially described based on the topology of FIG. 1.

The BIU 10 serves as an interface between a base station transceiver system (BTS) 5 and the MU 20. Although a case where three BTSs (BTS #1 to BTS #3) are connected to the single BIU 10 is illustrated in FIG. 1, the BIU 10 may be separately provided for each provider, each frequency band, or each sector.

In general, a base station signal transmitted from the BTS 5 is a radio frequency (RF) signal of high power. Hence, the BIU 10 may convert the RF signal of high power into a signal with power suitable to be processed in the MU 20 and transmit the converted signal to the MU 20. Also, the BIU 20, as shown in FIG. 1, may receive base station signals for each frequency band (or each provider or each sector), combine the received signals, and then transmit the combined signal to the MU 20.

When the BIU 10 converts RF signals of high power, transmitted from the BTS 5, into RF signals of low power, combines the RF signals, and then transmits the combined RF signal to the MU 20, the MU 20 may distribute the combined and transmitted RF signal for each branch. In this case, when the DAS 100 is implemented as the digital DAS, the BIU 10 may be separated into a unit for converting RF signals of high power into RF signals of low power, and a unit for converting the RF signals of low power into intermediate frequency (IF) signals, processing the converted IF signals into digital signals, and then combining the processed digital signals. Alternatively, when the BIU 10 performs only the function of converting the RF signals of high power, transmitted from the BTS 5 into the RF signals of low power, the MU 20 may combine the transmitted RF signals and distribute the combined RF signal for each branch.

As described above, the combined RF signal distributed from the MU 20 may be transmitted to the RUs 40 through the HUB 30 or directly transmitted to the RUs 40, for each branch (see Branch #1, . . . , Branch #k, . . . , Branch #N of FIG. 1). Each RU 40 may separate the transmitted combined RF signal for each frequency band and perform signal processing (analog signal processing in the analog DAS and digital signal processing in the digital DAS). Accordingly, each RU 40 can transmit RF signals to user terminals in its own service coverage through a service antenna. Specific components and functions of the RU 40 will be described in detail below with reference to FIG. 4.

In FIG. 1, it is illustrated that the BTS 5 and the BIU 10 are connected through an RF cable, the BIU 10 and the MU 20 are connected through an RF cable, and all nodes from the MU 20 to lower nodes thereof are connected through optical cables. However, a signal transport medium between nodes may be variously modified. As an example, the BIU 10 and the MU 20 may be connected through an RF cable, but may be connected through an optical cable or a digital interface. As another example, the MU 20 and HUB 30 may be connected through an optical cable, the MU 20 and the RU 40 directly connected thereto may be connected through an optical cable, and the cascade-connected RUs 40 may be connected through an RF cable, a twist cable, a UTP cable, etc. As still another example, the MU 20 and the RU 40 directly connected thereto may also be connected through an RF cable, a twist cable, a UTP cable, etc.

Hereinafter, this will be described based on FIG. 1. Therefore, in this embodiment, each of the MU 20, the HUB 30, and the RUs 40 may include an optical transceiver module for electrical-to-optical (E/O) conversion/optical-to-electrical (O/E) conversion. When node units are connected through a single optical cable, each of the MU 20, the HUB 30, and the RUs 40 may include a wavelength division multiplexing (WDM) element.

The DAS 100 may be connected to an external monitoring device, i.e., a network management server or system 50 through a network. Hereinafter, the monitoring device 50 will be briefly referred to as NMS 50. Accordingly, a manager can remotely monitor states and problems of the nodes in the DAS 100 through the NMS 50, and can remotely control operations of the nodes in the DAS 100 through the NMS 50.

Figure 2:
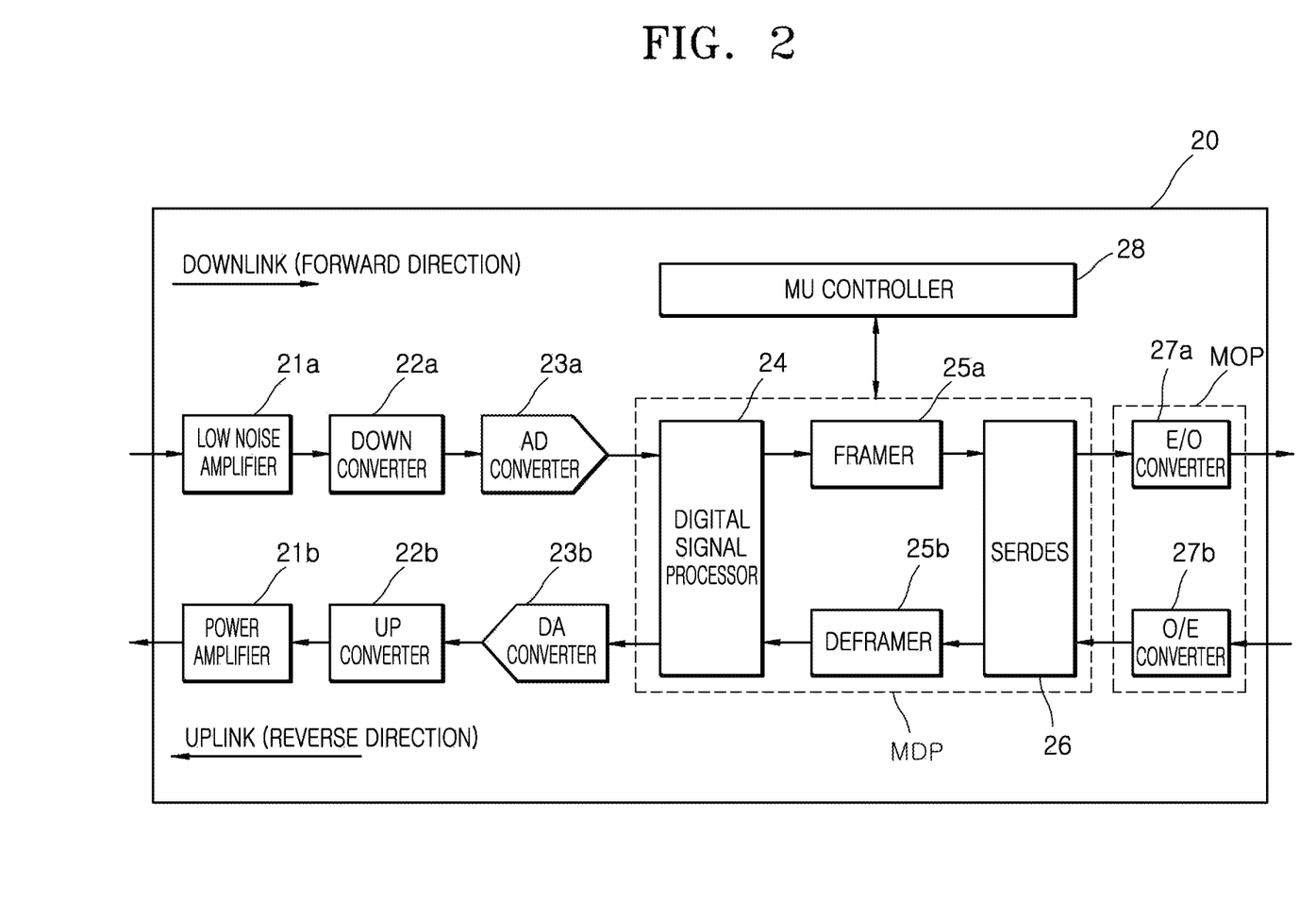
FIG. 2 is a block diagram illustrating an embodiment of a main unit in the DAS to which the inventive concept is applicable.

FIG. 2 is a block diagram illustrating an embodiment of the MU in the DAS to which the inventive concept is applicable. Here, the block diagram of FIG. 2 illustrates an embodiment in which, as described with reference to FIG. 1, the MU 20 is connected to the BIU 10 through an RF cable and connected to the HUB 30 or the RU 40 through an optical cable. Also, the block diagram of FIG. 2 exemplarily illustrates only components related to a function of performing, by the MU 20, a predetermined signal processing on a signal transmitted from BIU 10 through a downlink path and then transmitting the signal-processed signal to the HUB 30 or the RU 40, and processing a signal received from the HUB 30 or the RU 40 through an uplink path.

Referring to FIG. 2, based on a downlink path (i.e., a forward path), the MU 20 may include a low noise amplifier 21*a*, a down converter 22*a*, an analog-to-digital (AD) converter 23*a*, a digital signal processor 24, a framer 25*a*, a serializer/deserializer (SERDES) 26, and an electrical-to-optical (E/O) converter 27*a*.

In the downlink path of the MU 20, an RF signal transmitted from the BIU 10 (see FIG. 1) through an RF cable may be low-noise amplified by the low noise amplifier 21*a* and then frequency down-converted into an intermediate frequency (IF) signal by the down converter 22*a*. The converted IF signal may be converted into a digital signal by the AD converter 23*a* to be transmitted to the digital signal processor 24. The digital signal processor 24 may perform a function of digital signal processing, digital filtering, gain control, digital multiplexing, etc. on a digitized RF signal for each frequency band. The digitized RF signal passing through the digital signal processor 24 may be formatted in a format suitable for digital transmission through the framer 25*a*, converted into a serial digital signal by the SERDES 26, converted into an optical digital signal by the E/O converter 27*a*, and then transmitted to a lower node unit, e.g., the HUB 30 (see FIG. 1) or the RU 40 (see FIG. 1) through an optical cable.

Based on an uplink path (i.e., a reverse path), the MU 20 may include an optical-to-electrical (O/E) converter 27*b*, the SERDES 26, a deframer 25*b*, the digital signal processor 24, a digital-to-analog (DA) converter 23*b*, an up converter 22*b*, and a power amplifier 21*b*.

In the uplink path of the MU 20, an optical digital signal transmitted from a lower node unit through an optical cable may be converted into an electrical signal (serial digital signal) by the O/E converter 27*b*. The serial digital signal may be converted into a parallel digital signal by the SERDES 26. The parallel digital signal may be reformatted by the deframer 25*b* to be processed for each frequency band in the digital signal processor 24. The digital signal passing through the digital signal processor 24 may be converted into an analog signal through the DA converter 23*b*. Here, the analog signal is an IF signal, and hence may be frequency up-converted into an analog signal in the original RF band through the up converter 22*b*. The analog signal (i.e., the RF signal) converted into the analog signal in the original RF band is amplified through the power amplifier 21*b* and then transmitted to the BIU 10 through an RF cable.

In FIG. 2, the digital signal processor 24, the framer 25*a*, the deframer 25*b*, and the SERDES 26 may constitute a digital part MDP, and at least two of the digital signal processor 24, the framer 25a, the deframer 25b, and the SERDES 26 may be implemented as one field programmable gate array (FPGA). In addition, an MU controller 28 which will be described later may also be implemented, as the FPGA, together with the at least two of the digital signal processor 24, the framer 25a, the deframer 25b, and the SERDES 26. Although it is illustrated that the digital signal processor 24 and the SERDES 26 are commonly used in each of the downlink and uplink paths, the digital signal processor 24 and the SERDES 26 may be separately provided for each path.

In FIG. 2, at least two of the low noise amplifier 21a, the down converter 22a, and the AD converter 23a in the downlink path and the DA converter 23b, the up converter 22b and the power amplifier 21b in the uplink path may be implemented as one chip, e.g., a radio frequency integrated circuit (RFIC).

In FIG. 2, the E/O converter 27a and the O/E converter 27b may constitute an optical part MOP. Although it is illustrated that the corresponding E/O and O/E converters are provided in the downlink and uplink paths, respectively, the E/O and O/E converters may be implemented as a single optical transceiver module (e.g., a signal small form factor pluggable (SFP)).

In FIG. 2, it is illustrated that the power amplifier 21b and the up converter 22b are included in the MU 20. However, when the BIU 10, as described with reference with reference to FIG. 1, includes a unit for converting signals of high power into signals of low power or a unit for converting signals of low power into IF signals, processing the converted IF signals into digital signals, and then combining the processed digital signals, the power amplifier 21b and/or the up converter 22b may be omitted. Similarly, the low noise amplifier 21a and/or the down converter 22a may also be omitted in the MU 20, corresponding to components of the BIU 20.

Meanwhile, although not mentioned in the description related to the downlink and uplink paths, the MU 20 may further include an MU controller 28.

The MU controller 28 may be configured to transmit/receive signals to/from at least one of the digital signal processor 24, the framer 25a, the deframer 25b, and the SERDES 26, which constitute the digital part MDP.

The MU controller 28 may control the components in the digital part MDP of the MU 20 to perform a required signal processing operation. For example, the MU controller 28 may control the digital signal processor 24, the framer 25a, the deframer 25b, the SERDES 26, and the like, corresponding to a kind of signal transmitted between upper nodes and/or lower nodes, a required quality, etc. Specifically, the MU controller 28 may determine a kind of signal such as CDMA, WCDMA, LTE, or WiBro signal, transmitted from BTS 5 or the RU 40, and may control the components in the digital part MDP, corresponding to the determined kind.

However, this is merely illustrative, and it will be apparent that the MU controller 28 may be configured to transmit/receive signals to/from other components in the MU 20 as well as the digital part MDP, and may control the other components.

The MU controller 28 may receive signals for controlling the components in the MU 20 from the NMS 50 (see FIG. 1) connected through a wired or wireless network. Alternatively, the MU controller 28 may receive signals for controlling the components in the MU 20 through a lower node unit (the HUB 30 or the RU 40) (see FIG. 1). Alternatively, the MU controller 28 may receive, from the NMS 50, signals for controlling the components in the lower node unit, and may transmit the received signals to the corresponding node unit. Here, the signals for controlling the components in the lower node unit may be processed together with base station signals or separately processed by the digital part MDP to be transmitted to the other lower node units. Hereinafter, when control signals, commands, data, etc. are transmitted between node units, they are processed together with base station signals or separately processed by a digital part of one node unit to be transmitted to the other node units, and therefore, overlapping descriptions will be omitted.

The MU controller 28 may dump, into a predetermined storage area (e.g., a ROM, a RAM, etc.), data corresponding to signals processed in the digital signal processor 24, the framer 25a, the deframer 25b, the SERDES 26, and the like.

In an embodiment, the MU controller 28 may receive a data dump command directly transmitted from the NMS 50 or transmitted from the lower node unit, and may dump the data into the storage area in response to the data dump command. The MU controller 28 may directly transmit the dumped data as response data to the NMS 50 or transmit the dumped data to the NMS 50 through the lower node unit. However, the inventive concept is not limited thereto, and it will be apparent that the MU controller 28 may perform a predetermined processing process on the dumped data and then directly transmit the dumped data as the response data to the NMS 50 or transmit the dumped data to the NMS 50 through the lower node unit.

In another embodiment, the MU controller 28 may dump the data for a predetermined period regardless of the data dump command, and may directly transmit the dumped data as report data to the NMS 50 or transmit the dumped data to the NMS 50 through the lower node unit. However, the inventive concept is not limited thereto, and it will be apparent that the MU controller 28 may perform a predetermined processing process on the dumped data and then directly transmit the dumped data as the report data to the NMS 50 or transmit the dumped data to the NMS 50 through the lower node unit.

Accordingly, the NMS 50 can generate predetermined information representing the quality of a signal, the occurrence of a failure, etc. on a specific signal path in the MU 20 and provide a manager with the generated information. When a failure occurs, the manager enables the NMS 50 to take action against the failure, or the NMS 50 can directly take action against the failure. This will be described in detail with reference to FIGS. 5 and 6.

Meanwhile, according to an embodiment, the MU controller 28 may detect the occurrence of an failure by analyzing the quality of a signal on a specific signal path, based on the response data or the report data, and may generate self-analysis information representing the occurrence of the failure on the specific signal path, based on the detected result. The MU controller 28 may transmit the generated self-analysis information to the NMS 50. Alternatively, the MU controller 28 may take action against the failure by controlling components related to the specific signal path on which the failure occurs, based on the generated self-analysis information.

Figure 3:
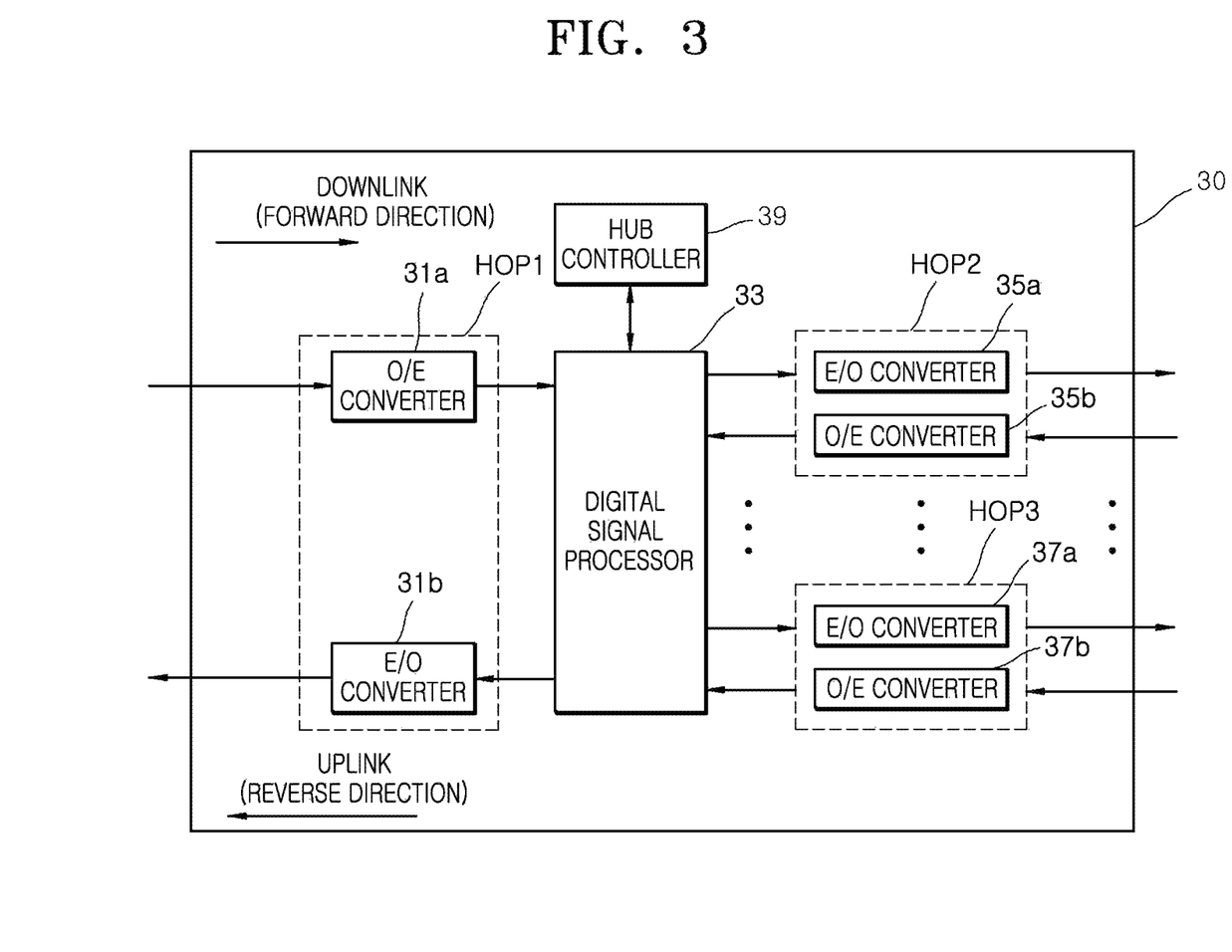
FIG. 3 is a block diagram illustrating an embodiment of a hub unit in the DAS to which the inventive concept is applicable.

FIG. 3 is a block diagram illustrating an embodiment of the HUB in the DAS to which the inventive concept is applicable.

Referring to FIG. 3, based on a downlink path, the HUB 30 may include an O/E converter 31a, a digital signal processor 33, and E/O converters 35a and 37a.

In the downlink path of the HUB 30, an optical digital signal transmitted from the MU through an optical cable may be converted into an electrical signal by the O/E converter 31a. The digital signal processor 33 may perform predetermined signal processing on the converted electrical signal and distribute the converted electrical signal to the plurality of E/O converters 35a and 37a. Each of the E/O converters 35a and 37a may receive the distributed signal to convert the electrical signal into an optical digital signal and transmit the converted optical digital signal to the lower RU 40. Although only two E/O converters 35a and 37a are illustrated in FIG. 3 for convenience of illustration, the E/O converter may be provided in plurality corresponding to the number of RU 40 (see FIG. 1) connected as lower node units to the HUB 30.

Based on an uplink path, the HUB 30 may include O/E converters 35b and 37b, the digital signal processor 33, and an E/O converter 31b.

An optical digital signal transmitted from the RU 40 through an optical cable may be converted into electrical signals by the O/E converters 35b and 37b. The digital signal processor 33 may combine the plurality of converted electrical signals and transmit the combined electrical signal to the E/O converter 31b. The E/O converter 31b may convert the combined electrical signal into an optical digital signal and transmit the converted optical digital signal to the upper MU 20 (see FIG. 1).

In FIG. 3, it is illustrated that corresponding O/E and E/O converters are separately provided for each of optical parts HOP1, HOP2, and HOP3. However, as described with reference to FIG. 2, each of the optical parts HOP1, HOP2, and HOP3 may be configured as a single optical transceiver module.

Meanwhile, although not mentioned in the description related to the downlink and uplink paths, the HUB 30 may further include a HUB controller 39.

The HUB controller 39 may be configured to transmit/receive signals to/from the digital signal processor 33, and may control the components in the digital signal processor 33 to perform a required signal processing operation. However, this is merely illustrative, and it will be apparent that the HUB controller 39 may be configured to transmit/receive signals to/from other components in the HUB 30 as well as the digital signal processor 33, and may control the other components.

The HUB controller 39 may receive signals for controlling the components in the HUB 30 from the NMS 50 (see FIG. 1) connected through the wired or wireless network. Alternatively, the HUB controller 39 may receive signals for controlling the components in the HUB 30 through an adjacent node unit (the MU 20 or the RU 40) (see FIG. 1). The HUB controller 39 may receive, from the NMS 50, signals for controlling the components in the adjacent node unit, and may transmit the received signals to the corresponding node unit.

The HUB controller 39 may dump, into a predetermined storage area (e.g., a ROM, a RAM, etc.), data corresponding to signals processed in the digital signal processor 33.

In an embodiment, the HUB controller 39 may receive a data dump command that is directly transmitted from the NMS 50 (see FIG. 1) connected through the wired or wireless network or transmitted from the adjacent node unit. The HUB controller 39 may dump the data into the storage area in response to the data dump command. The HUB controller 39 may directly transmit the dumped data as response data to the NMS 50 or transmit the dumped data to the NMS 50 through the adjacent node unit. However, the inventive concept is not limited thereto, and it will be apparent that the HUB controller 39 may perform a predetermined processing process on the dumped data and then directly transmit the dumped data as the response data to the NMS 50 or transmit the dumped data to the NMS 50 through the adjacent node unit.

In another embodiment, the HUB controller 39 may dump the data for a predetermined period regardless of the data dump command, and may directly transmit the dumped data as report data to the NMS 50 or transmit the dumped data to the NMS 50 through the adjacent node unit. However, the inventive concept is not limited thereto, and it will be apparent that the HUB controller 39 may perform a predetermined processing process on the dumped data and then directly transmit the dumped data as the report data to the NMS 50 or transmit the dumped data to the NMS 50 through the adjacent node unit.

Accordingly, the NMS 50 can generate predetermined information representing the quality of a signal, the occurrence of a failure, etc. on a specific signal path in the HUB 30 and provide a manager with the generated information. When a failure occurs, the manager enables the NMS 50 to take action against the failure, or the NMS 50 can directly take action against the failure.

Meanwhile, according to an embodiment, the HUB controller 39 may detect the occurrence of a failure by analyzing the quality of a signal on a specific signal path, based on the response data or the report data, and may generate self-analysis information representing the occurrence of the failure on the specific signal path, based on the detected result. The HUB controller 39 may transmit the generated self-analysis information to the NMS 50. Alternatively, the HUB controller 39 may take action against the failure by controlling components related to the specific signal path on which the failure occurs, based on the generated self-analysis information.

Figure 4:
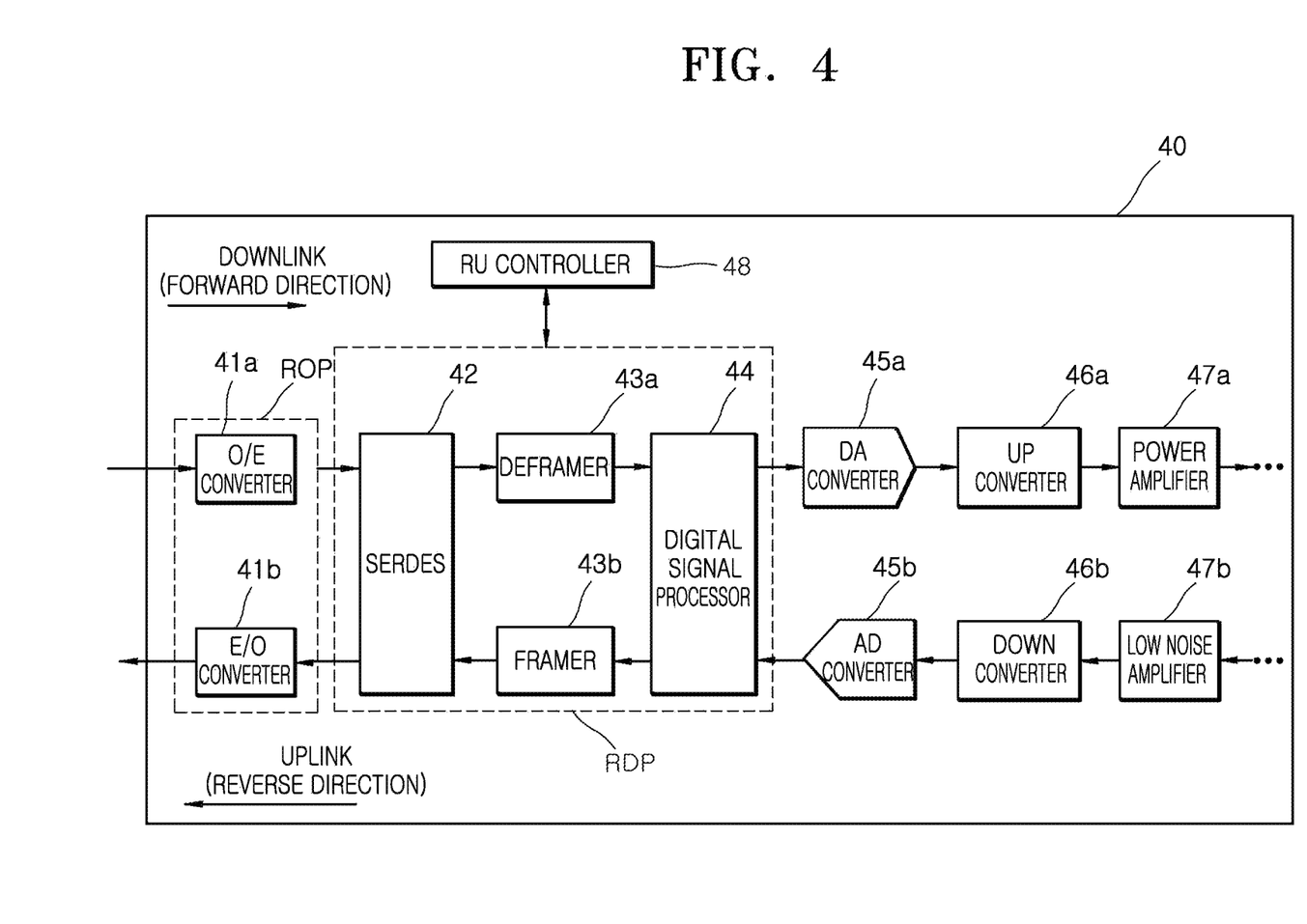
FIG. 4 is a block diagram illustrating an embodiment of a remote unit in the DAS to which the inventive concept is applicable.

FIG. 4 is a block diagram illustrating an embodiment of the RU in the DAS to which the inventive concept is applicable.

Here, the block diagram of FIG. 4 illustrates an embodiment related to the RU 40 in the digital DAS in which node units are connected through an optical cable. Also, the block diagram of FIG. 4 illustrates only components related to a function of providing terminal in service coverage with signals from an upper node unit through a downlink path and processing terminal signals received from the terminals in the service coverage through an uplink path.

Referring to FIG. 4, based on a downlink path, the RU 40 may include an O/E converter 41a, a SERDES 42, a deframer 43a, a digital signal processor 44, a DA converter 45a, an up converter 46a, and a power amplifier 47a.

In the downlink path of RU 40, an optical digital signal transmitted from an upper node unit (the MU 20 or the HUB 30) (see FIG. 1) through an optical cable may be converted into an electrical signal (serial digital signal) by the O/E converter 41a. The serial digital signal may be converted into a parallel digital signal by the SERDES 42. The parallel digital signal may be reformatted by the deframer 43a to be processed for each frequency band in the digital signal processor 44. The digital signal processor 44 may perform a function of digital signal processing, digital filtering, gain control, digital multiplexing, etc. on the reformatted digital signal for each frequency band. The digital signal passing through the digital signal processor 44 may be converted into an analog signal through the DA converter 45a. Here, the analog signal is an IF signal, and hence may be frequency up-converted into an analog signal in the original RF band through the up converter 46a. The analog signal (i.e., the RF signal) converted into the analog signal in the original RF band may be amplified through the power amplifier 47a to transmitted through a service antenna (not shown).

Based on an uplink path, the RU 40 may include a low noise amplifier 47b, a down converter 46b, an AD converter 45b, the digital signal processor 44, a framer 43b, the SERDES 42, and an E/O converter 41b.

In the uplink path of the RU 40, an RF signal (i.e., a terminal signal) received through the service antenna (not shown) from a user terminal (not shown) in a service coverage may be low-noise amplified by the low noise amplifier 47b and frequency down-converted into an IF signal by the down converter 46b. The converted IF signal may be converted into a digital signal by the AD converter 45b to be transmitted to the digital signal processor 44. The digital signal passing through the digital signal processor 44 may be formatted in a format suitable for digital transmission through the framer 43b and converted into a serial digital signal by the SERDES 42. The serial digital signal may be converted into an optical digital signal by the E/O converter 41b to be transmitted to an upper node unit through an optical cable.

Although not clearly shown in FIG. 4, the following method may be used when a signal transmitted from an upper node unit is transmitted to a lower adjacent RU cascade-connected to the upper node unit in a state in which the RUs 40 are cascade-connected to each other as illustrated in FIG. 1. For example, when an optical digital signal transmitted from an upper node unit is transmitted to a lower adjacent RU cascade-connected to the upper node unit, the optical digital signal transmitted from the upper node unit may be transmitted to the lower adjacent RU sequentially through the O/E converter, the SERDES, the deframer, the framer, the SERDES, and the E/O converter.

As described with reference to FIG. 4, the SERDES 42, the deframer 43a, the framer 43b, and the digital signal processor 44 in the RU 40 may constitute a digital part RDP, and at least two of the SERDES 42, the deframer 43a, the framer 43b, and the digital signal processor 44 may be implemented as one FPGA. In addition, an RU controller 48 which will be described later may also be implemented, as the FPGA, together with the at least two of the SERDES 42, the deframer 43a, the framer 43b, and the digital signal processor 44. Although it is illustrated in FIG. 4 that the SERDES 42 and the digital signal processor 44 are commonly used in each of the downlink and uplink paths, the SERDES 42 and the digital signal processor 44 may be separately provided for each path.

In FIG. 4, at least two of the DA converter 45a, the up converter 46a, and the power amplifier 47a in the downlink path and the low noise amplifier 47b, the down converter 46b, and the AD converter 45b in the uplink path may be implemented as one chip, e.g., one RFIC.

In FIG. 4, the O/E converter 41a and the E/O converter 41b may constitute an optical part ROP. Although it is illustrated that the corresponding E/O and O/E converters are provided in the downlink and uplink paths, respectively, the E/O and O/E converters may be implemented as a single optical transceiver module.

Meanwhile, although not mentioned in the description related to the downlink and uplink paths, the RU 40 may further include an RU controller 48.

The RU controller 48 may be configured to transmit/receive signals to/from at least one of the SERDES 42, the deframer 43a, the framer 43b, and the digital signal processor 44, which constitute a digital part RDP. The RU controller 48 may control the components in the digital part RDP to perform a required signal processing operation. However, this is merely illustrative, and it will be apparent that the RU controller 48 may be configured to transmit/receive signals to/from other components in the RU 20 as well as the digital part RDP, and may control the other components.

The RU controller 48 may receive signals for controlling the components in the RU 40 from the NMS 50 (see FIG. 1) connected through the wired or wireless network. Alternatively, the RU controller 48 may receive signals for controlling the components in the RU 40 through an upper node unit (the MU 20 or the HUB 30) (see FIG. 1). The RU controller 48 may receive, from the NMS 50, signals for controlling the components in the upper node unit, and may transmit the received signals to the corresponding node unit.

The RU controller 48 may dump, into a predetermined storage area (e.g., a ROM, a RAM, etc.), data corresponding to signals processed in the SERDES 42, the deframer 43a, the framer 43b, the digital signal processor 44, etc.

In an embodiment, the RU controller 48 may receive a data dump command that is directly transmitted from the NMS 50 or transmitted from the upper node unit. The RU controller 48 may dump the data into the storage area in response to the data dump command. The RU controller 48 may directly transmit the dumped data as response data to the NMS 50 or transmit the dumped data to the NMS 50 through the upper node unit. However, the inventive concept is not limited thereto, and it will be apparent that the RU controller 48 may perform a predetermined processing process on the dumped data and then directly transmit the dumped data as the response data to the NMS 50 or transmit the dumped data to the NMS 50 through the upper node unit.

In another embodiment, the RU controller 48 may dump the data for a predetermined period regardless of the data dump command, and may directly transmit the dumped data as report data to the NMS 50 or transmit the dumped data to the NMS 50 through the upper node unit. However, the inventive concept is not limited thereto, and it will be apparent that the RU controller 48 may perform a predetermined processing process on the dumped data and then directly transmit the dumped data as the report data to the NMS 50 or transmit the dumped data to the NMS 50 through the upper node unit.

Accordingly, the NMS 50 can generate predetermined information representing the quality of a signal, the occurrence of a failure, etc. on a specific signal path in the RU 40 and provide a manager with the generated information. When a failure occurs, the manager enables the NMS 50 to take action against the failure, or the NMS 50 can directly take action against the failure. This will be described in detail with reference to FIGS. 5 and 6.

Meanwhile, according to an embodiment, the RU controller 48 may detect the occurrence of a failure by analyzing the quality of a signal on a specific signal path, based on the response data or the report data, and may generate self-analysis information representing the occurrence of the failure on the specific signal path, based on the detected result. The RU controller 48 may transmit the generated self-analysis information to the NMS 50. Alternatively, the RU controller 48 may take action against the failure by controlling components related to the specific signal path on which the failure occurs, based on the generated self-analysis information.

In the above, a configuration example of one form of the topology of the DAS, the MU 20, the HUB 30, and the RU 40 has been described with reference to FIGS. 1 to 4. However, the configuration example of FIGS. 1 to 4 is merely one embodiment, and it will be apparent that various application examples may be considered.

Figure 5:
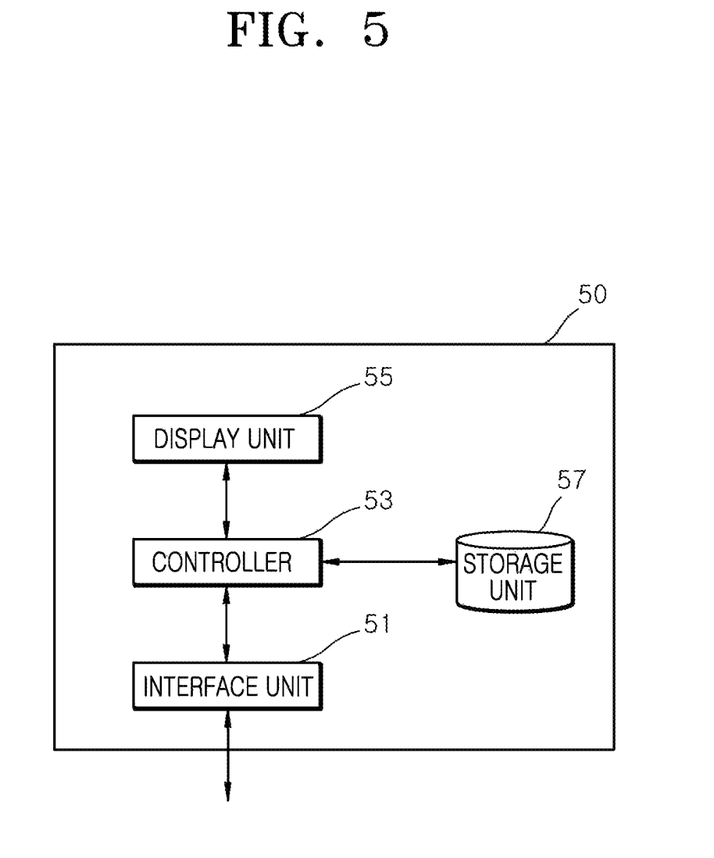
FIG. 5 is a block diagram illustrating a monitoring device for the DAS according to an embodiment of the inventive concept.

FIG. 5 is a block diagram illustrating a monitoring device for the DAS according to an embodiment of the inventive concept. The monitoring device 50, i.e., the NMS 50, as shown in FIG. 1, may be communicatively coupled to node units constituting the DAS 100. The NMS 50 enables a manager to monitor the quality of signals passing through various paths in a target node unit to be monitored among the node units by using data related to signal processing, transmitted from the target node unit. Also, the NMS 50 detects a failure of the target node unit or a node unit adjacent to the target node unit, to enable the manager to identify the detected failure or to directly take action against the detected failure.

Referring to FIG. 5, the NMS 50 may include an interface unit 51, a controller 53, a display unit 55, and a storage unit 57.

First, the controller 53 may control overall operations of the NMS 50. The controller 53 may generate various commands and control signals for controlling a target node unit. The controller 53 may generate predetermined information by using response data and report data, transmitted from the target node unit.

For example, the controller 53 may generate a data dump command for a target signal passing through a specific signal path of the target node unit. The controller 53 may receive a manager's dump request input through a predetermined graphic user interface (GUI) displayed on the display unit 55, and may generate the data dump command in response to the manager's dump request input.

The controller 53 may transmit the data dump command to the interface unit 51 such that the data dump command is transmitted to the target node unit. The target node unit may dump data stored therein while the target signal is being processed through a signal processing configuration related to the specific signal path in response to the data dump command, and may transmit the dumped data as response data to the NMS 50.

The controller 53 may receive the response data through the interface unit 51, and may generate quality information by using the response data. For example, the quality information may represent a quality index related to characteristics of the target signal, such as spectrum, power, peak level in time domain, adjacent channel leakage ratio (ACLR), error vector magnitude (EVM), occupied bandwidth (OBW), spectrum emission mask (SEM), noise figure (NF), complementary cumulative distribution function (CCDF), signal to noise ratio (SNR), and spurious characteristic. However, the inventive concept is not limited thereto, and it will be apparent that the quality information may represent a quality index related to characteristics of various other signals.

The controller 53 may receive a manager's information output request input through the predetermined GUI displayed on the display unit 55. The controller 53 may transmit the quality information to the display unit 55 in response to the manager's information output request input. Accordingly, the display unit 55 can display the quality information, and the manager can detect the occurrence of an failure by monitoring a quality status of signals in a specific signal path of the target node unit.

Meanwhile, the target node unit may dump data stored therein while the target signal is being processed through a signal processing configuration related to the specific signal path regardless of the data dump command, and may transmit the dumped data as response data to the NMS 50. Here, self-data dump of the target node unit may be performed for a predetermined period.

In this case, the controller 53 may receive the report data through the interface unit 51, and may generate quality information by using the report data. Also, the controller 53 may transmit quality information to the display unit 55 in response to a manager's information output request through the GUI. Alternatively, the controller 53 may arbitrarily transmit quality information to the display unit 55. Accordingly, the display unit 55 can display the quality information, and the manager can detect the occurrence of a failure by monitoring a quality status of signals in a specific signal path of the target node unit.

According to an embodiment, the controller 53 may analyze whether an failure has occurred in a signal path of a corresponding target node, based on response data or report data, and may generate analysis information representing whether a failure has occurred in the corresponding signal path, based on the analyzed result. The controller 53 may analyze whether a failure has occurred from the response data or the report data according to a previously set algorithm. The analysis information may further include information on a component (node unit) related to the failure, information related to a cause of the failure, etc. The controller 53 may transmit the analysis information to the display unit 55 in response to a manager's request through the GUI. Alternatively, the controller 53 may arbitrarily transmit the analysis information to the display unit 55. Accordingly, the display unit 55 can display the analysis information, and the manager can identify whether a failure has occurred in the specific signal path of the target node unit, to take action against the failure.

The controller 53 may receive, from a target node, self-analysis information generated as the corresponding target node analyzes whether an failure has occurred in a specific signal path. The self-analysis information may further include information on a component (node unit) related to the failure, information related to a cause of the failure, etc. It will be apparent that the controller 53 may display the self-analysis information on the display unit 55 in response to a manager's request through the GUI or may arbitrarily display the self-analysis information on the display unit 55.

According to another embodiment, the controller 53 may detect whether a failure has occurred in a signal path of a corresponding target node, based on response data or report data. The controller 53 may generate a predetermined control signal for controlling the target node unit in which the failure has directly occurred or another node unit, based on the detected result. For example, when the target node unit is an RU, and it is detected that a failure has occurred in a component on an uplink path of the corresponding RU, the controller 53 may generate a signal for controlling a HUB, an MU, etc. as an upper node of the corresponding RU not to sum up a signal transmitted from the corresponding RU to signals transmitted from other RUs. The controller 53 may transmit the generated control signal to the target node in which the failure has occurred or another node unit through the interface unit 51, to rapidly take action against the failure.

Meanwhile, the controller 53 may generate a predetermined control signal for controlling the target node unit in which the failure has occurred or another node unit, based on self-analysis information transmitted from the target node, to take action against the failure.

The controller 53 may transmit, to the storage unit 57, at least one of the response data, the report data, the quality information, the analysis information, and the self-analysis information. The controller 53 may transmit data and information to the storage unit 57 at a previously set time interval for only a specific time. Alternatively, the controller 53 may transmit related information to the storage unit 57 only when a failure is detected. Meanwhile, kinds and conditions of the data and the information to be stored in the storage unit 57 may be set in response to a manager's input through a predetermined GUI.

The interface unit 51 may transmit/receive a data dump command, response data, report data, etc. to/from the target node unit through a wired or wireless network. The data dump command, the response data, the report data, etc. may be transmitted through a control & management (C&M) channel between the interface unit 51 and the target node. For example, the C&M channel may be a channel except a payload through which processing and/or processed data is transmitted, and may use a protocol such as Ethernet. However, the inventive concept is not limited thereto, and the data dump command, the response data, the report data, etc. may be transmitted through a different channel from the C&M channel. For example, the data dump command, the response data, the report data, etc. may be transmitted through a specific channel between the interface unit 51 and the target node unit. For example, like a channel for transmission/reception of a delay measurement pulse, the specific channel may be a channel separately assigned between the interface unit 51 and the target node unit so as to transmit/receive the data dump command, the response data, the report data, etc.

The display unit 55 may be a display device for displaying predetermined GUIs. The storage unit 57 may be a storage device for storing response data, report data, quality information, analysis information, etc.

Figure 6:
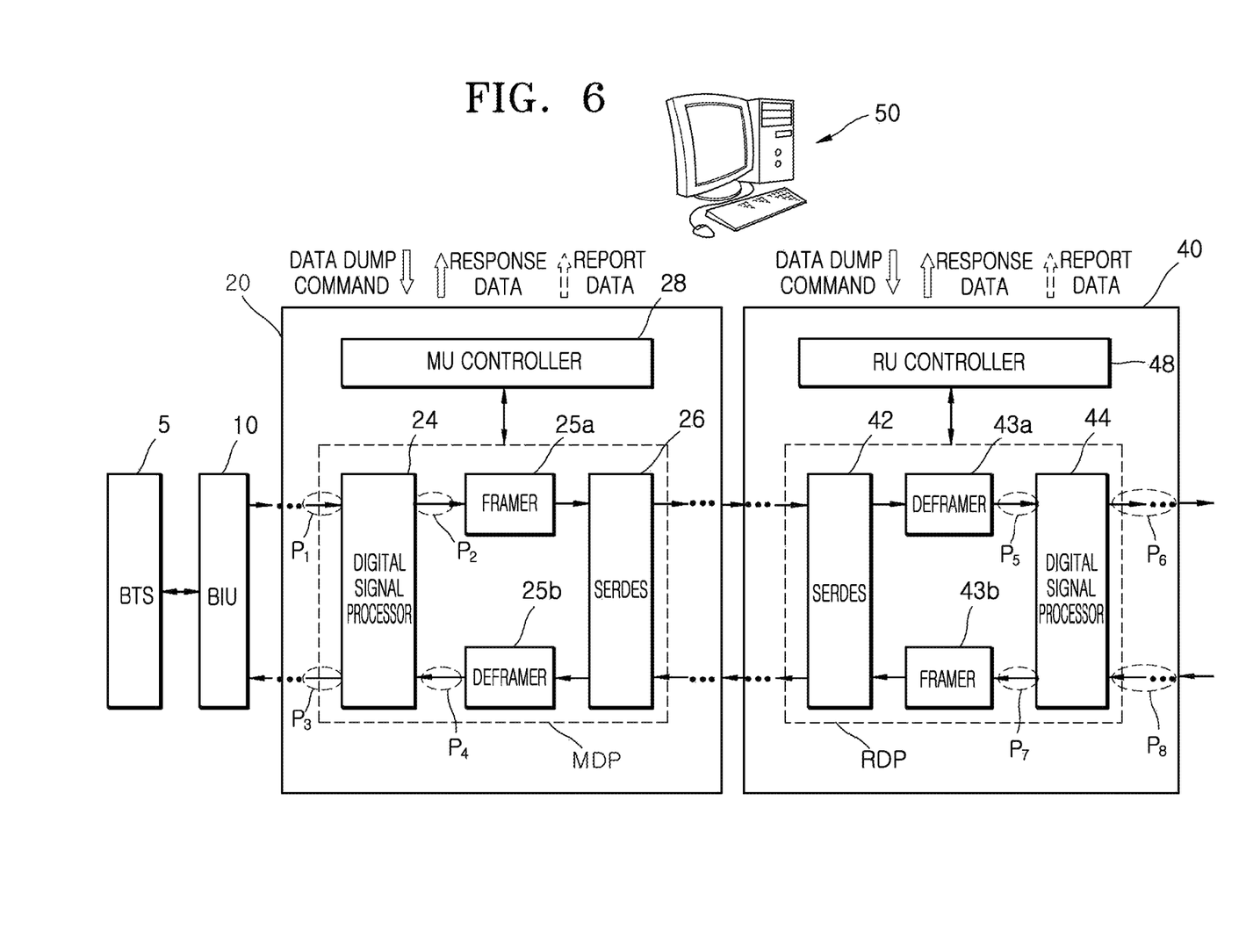
FIG. 6 is a diagram illustrating an operation of the monitoring device for the DAS according to the embodiment of the inventive concept.

FIG. 6 is a diagram illustrating an operation of the monitoring device for the DAS according to the embodiment of the inventive concept. In FIG. 6, for convenience of illustration, the HUB 30 is omitted, and only the BTS 5, the BIU 10, the MU 20, the RU 40, and the NMS 50 are illustrated. Also, for convenience in description that target nodes are the MU 20 and the RU 40, only the digital parts MDP and RDP respectively corresponding to the MU 20 and the RU 40 are illustrated in FIG. 6. Hereinafter, an operation of the NMS 50 will be described with reference to FIG. 6 together with FIG. 5.

A case where a target node is the MU 20 will be described with reference to FIGS. 5 and 6. The controller 53 of the NMS 50 transmits, to the MU controller 28, a data dump command for a target signal passing through a specific signal path of the MU controller 28 through the interface unit 51 in response to a manager's request, and the MU controller 28 transmits response data on the target signal to the NMS 50 by performing a data dump.

As an example of the specific signal path detected in FIG. 6, input/output terminals of the digital signal processor 24 are represented by dotted-line circles. That is, path P1 and path P2 in the downlink path and path P3 and path P4 in the uplink path are illustrated based on the digital signal processor 24 of the MU 20.

When the manager intends to identify signal quality and/or detect the occurrence of an failure in the path P1, the controller 53 transmits, to the MU controller 28, a data dump command for a target signal passing through the path P1 through the interface unit 51. The MU controller 28 transmits, to the controller 53, response data corresponding to the target signal passing through the path P1 from the digital signal processor 24 in response to the data dump command.

The controller 53 may generate quality information representing the quality of the target signal by using the response data and transmit the generated quality information to the display unit 55. Alternatively, the controller 53 may generate analysis information representing whether a failure has directly occurred in the path P1, a cause of the failure, etc. by using the response data. Here, it can be determined which component and which node unit the failure in the path P1 results from, based on address information included in the response data. That is, components related to a specific path of a specific node and address information on node units are included response data corresponding to the data dump command.

In FIG. 6, when it is detected by the NMS 50 that a failure has occurred in the path P1 due to abnormality of the quality of a signal passing through the path P1, e.g., a signal transmitted from the BIU 10, the manager may determine the failure as a defect of the BIU 10 or a defect of the base station, i.e., the BTS 5. If the BIU 10 is omitted, the manager may determine the failure as a defect of the BTS 5. Meanwhile, according to an embodiment, the BIU 10 may be monitored by the NMS similarly to other node units. In this case, the manager may detect a specific cause of the occurrence of the failure by additionally requesting a data dump command for input and output paths of the BIU 10 through the NMS 50. For example, when the quality of a signal passing through the input path of the BIU 10 is abnormal, the manager may determine the abnormality as a defect of the BTS 5. When the quality of a signal passing through the output path of the BIU 10 is abnormal, the manager may determine the abnormality as a defect of the BIU 10. Thus, a specific cause of the occurrence of a failure can be detected.

Similarly, the NMS 50 may generate quality information and analysis information, based on response data by performing a data dump on each of the paths P2 to P4, corresponding to a manager's input. The manager may detect a cause of the occurrence of a failure in each of the paths P2 to P4, based on the quality information and the analysis information, to take action against the failure.

For example, when it is detected by the NMS 50 that a failure has occurred in the path P2 due to abnormality of the quality of a signal passing through the path P2, the manager may determine the failure as a defect of the digital signal processor 24, a defect of the BIU 10, a defect of a component (e.g., the AD converter 23a (see FIG. 2), etc.) prior to the digital part MDP on the downlink path. In order to more specifically analyze a cause of the occurrence of the failure, quality information and analysis information on the path P2 may be used together with the quality information and analysis information on the path P1.

Similarly to the monitoring method of the MU 20, the NMS 50 may request a data dump to be performed on each of paths P4 to P8 in response of a manager's input, and may receive response data transmitted from the RU controller 48 of the RU 40 in response to the data dump. The NMS 50 may generate quality information and analysis information, based on the response data transmitted from the RU 40. Accordingly, the manager can detect a cause of the occurrence of a failure in each of the paths P4 to P8, to take action against the failure.

For example, when it is detected by the NMS 50 that a failure has occurred in the path P8 due to abnormality of the quality of a signal passing through the path P8, the manager may determine the failure as a defect of a component posterior to the digital part on the uplink path, e.g., the AD converter 45b, the service antenna of the RU 40, a lower RU, etc. Meanwhile, in order to respond a manager's input or prevent degradation of the DAS 100, the NMS 50 may generate a signal for controlling the digital signal processor 24 such that the upper MU 20 does not sum up a reverse signal of the RU 40 in which the failure has occurred to signals transmitted from other RUs, and may transmit the generated signal to the MU controller 28 of the MU 20.

Meanwhile, similarly to the method of monitoring the target node unit by using the response data received in response to the data dump command, the NMS 50 may generate predetermined information such that the manager can monitor the quality of a signal passing through a specific signal path in the MU 20 or the RU 40 and the occurrence of a failure, based on report data transmitted from the MU 20 or the RU 40. Further, the NMS 50 may generate a signal for controlling a node unit in which a failure has occurred to be transmitted to the corresponding node unit.

Although the inventive concept has been described in connection with the exemplary embodiments, the inventive concept is not limited thereto but defined by the appended claims. Accordingly, it will be understood by those skilled in the art that various modifications and changes can be made thereto without departing from the spirit and scope of the inventive concept defined by the appended claims.

What is claimed is:

1. A monitoring device for a distributed antenna system including at least two node units communicatively coupled to each other and transmitting input base station signals to user terminals or transmitting an input user terminal signal to at least one base station through the node units, the monitoring device comprising:
    a controller configured to generate a data dump command for a first target signal passing through a first signal path in a digital part of at least one target node unit among the node units in response to a dump request input; and
    an interface unit configured to transmit the data dump command to the target node unit through a network and receive response data from the target node unit through the network,
    wherein the controller is further configured to generate first quality information indicative of quality of the first target signal by using the response data, and
    wherein the target node unit is configured to, in response to the data dump command, store first data corresponding to the first target signal being processed by signal processing components related to the first signal path and transmit the first data to the monitoring device as the response data through the network.

2. The monitoring device of claim 1, wherein the first quality information indicates a quality index for the first target signal,
    wherein the quality index is related to at least one signal quality characteristic among spectrum, power, peak level in time domain, adjacent channel leakage ratio (ACLR), error vector magnitude (EVM), occupied bandwidth (OBW), spectrum emission mask (SEM), noise figure (NF), complementary cumulative distribution function (CCDF), signal to noise ratio (SNR), and spurious characteristic.

3. The monitoring device of claim 1, wherein the monitoring device further comprises:
    a display unit configured to display the first quality information.

4. The monitoring device of claim 3, wherein the controller is further configured to receive the dump request input through a predetermined graphic user interface (GUI) displayed on the display unit.

5. The monitoring device of claim 3, wherein the controller is further configured to receive an information output request input through the predetermined GUI displayed on the display unit, and transmits the first quality information to the display unit in response to the information output request input.

6. The monitoring device of claim 1, wherein the interface unit is further configured to receive, from the target node unit, report data on a second target signal passing through a second signal path in the digital part of the target node unit through the network, and
    wherein the controller further configured to generate second quality information indicative of quality of the second target signal by using the report data.

7. The monitoring device of claim 6, wherein the target node unit is further configured to, at a predetermined period regardless of the data dump command, store second data in connection with the second target signal is being processed by signal processing components related to the second signal path and transmit the second data to the monitoring device as the report data through the network.

8. The monitoring device of claim 1, wherein the controller is further configured to analyze whether a failure has occurred in the first signal path by using the response data, and generates first analysis information indicative of whether the failure has occurred in the first signal path, based on the analyzed result.

9. The monitoring device of claim 1, wherein the controller is further configured to detect whether a failure has occurred in the first signal path by using the response data and generate a predetermined control signal for controlling the signal processing components related to the first signal path, based on the detected result, and
    wherein the interface unit is further configured to transmit the control signal to the target node unit through the network.

10. The monitoring device of claim 1, wherein the data dump command and the response data are transmitted through a control & management (C&M) channel or a specific channel in the network between the monitoring device and the target node unit.

11. A monitoring device for a distributed antenna system including at least two node units communicatively coupled to each other and transmitting input base station signals to user terminals or transmitting an input user terminal signal to at least one base station through the node units, the monitoring device comprising:
    an interface unit configured to receive, from at least one target node unit among the node units, report data on a target signal passing through a specific signal path in a digital part of the target unit node through a network; and
    a controller configured to generate quality information indicative of quality of the target signal by using the report data,
    wherein the target node unit is configured to, at a predetermined period, store data corresponding to the target signal being processed by signal processing components related to the specific signal path, and transmit the data to the monitoring device as the report data through the network.

12. The monitoring device of claim 11, wherein the quality information indicates a quality index for the target signal, wherein the quality index is related to at least one signal quality characteristic among spectrum, power, peak level in time domain, ACLR, EVM, OBW, SEM, NF, CCDF, SNR, and spurious characteristic.

13. The monitoring device of claim 11, wherein the interface unit is further configured to receive, from the target node unit, self-analysis information indicative of whether a failure has occurred in the specific signal path in the target node unit through the network.

14. The monitoring device of claim 13, wherein the controller is further configured to generate a predetermined control signal for controlling the signal processing components related to the specific signal path, based on the self-analysis information, and wherein the interface unit is further configured to transmit the control signal to the target node unit through the network.

* * * * *